Sheet 1 - 2 Sheets.
N. Rillieux,
Evaporating Pan,
No. 439. Reissued Mar. 17. 1857.
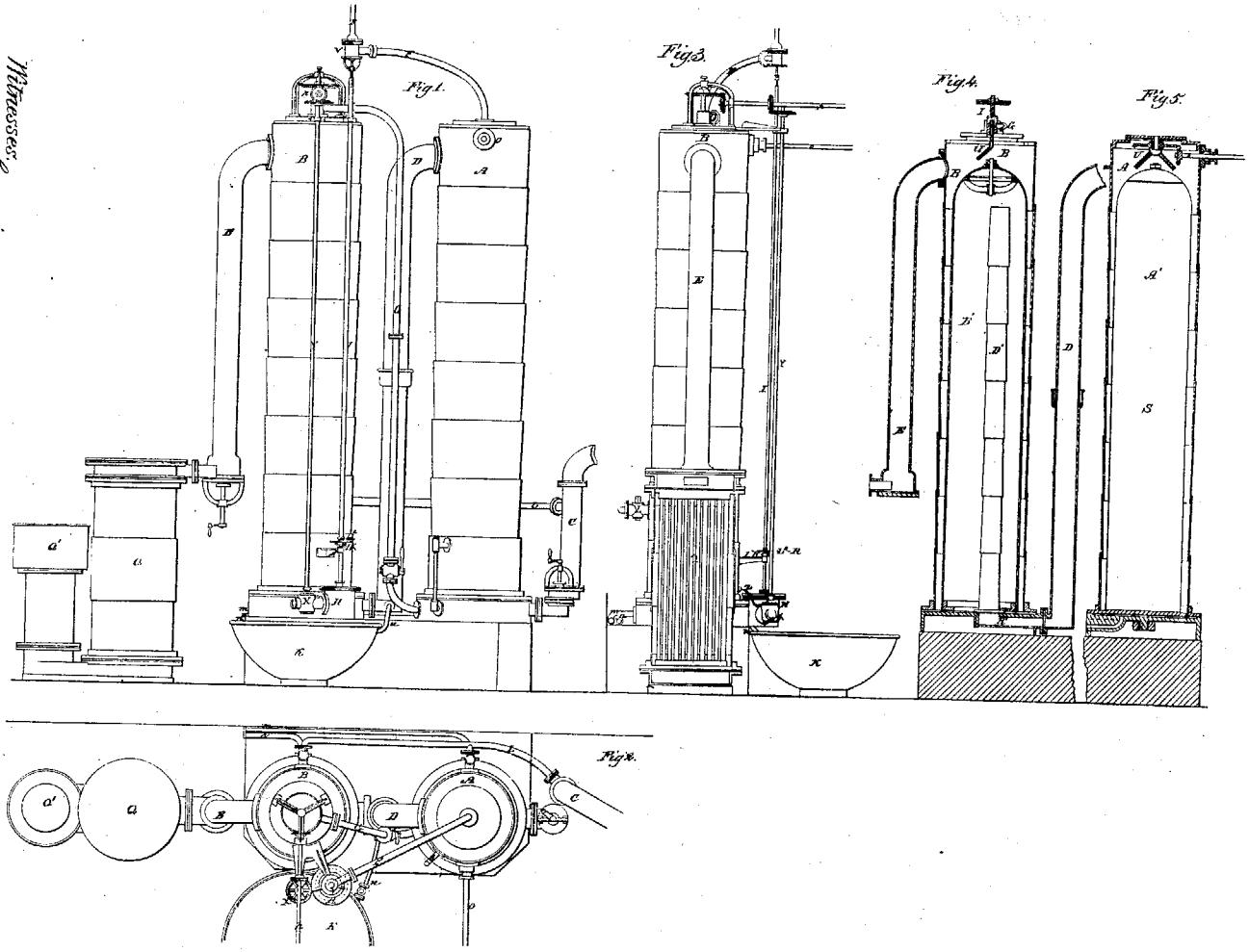
Witnesses.
J. Harding
J. H. B. Jenkins.
Inventor.
N. Rillieux.
THE NORRIS PETERS CO., PHOTO-LITHO., WASHINGTON, D. C.

Sheet 2-2 Sheets
N. Rillieux,
Evaporating Pan,
No. 439. Reissued Mar. 17, 1857.
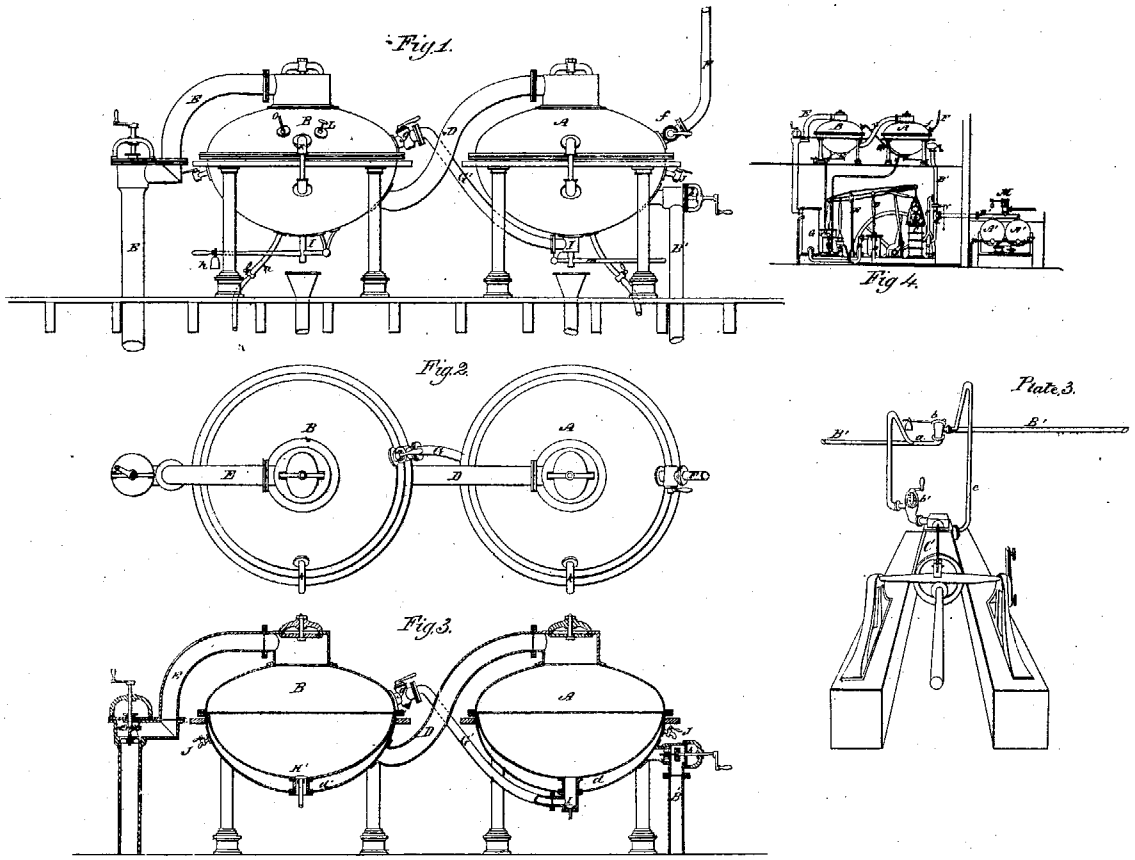
Witnesses:
J. H. B. Jenkins
Inventor:
N. Rillieux
THE NORRIS PETERS CO., PHOTO-LITHO., WASHINGTON, D. C.

UNITED STATES PATENT OFFICE.

NORBERT RILLIEUX, OF NEW YORK, N. Y.

IMPROVEMENT IN SUGAR-WORKS.

Specification forming part of Letters Patent No. 3,237, dated August 26, 1843; Reissue No. 439, dated March 17, 1857.

*To all whom it may concern:*

Be it known that I, NORBERT RILLIEUX, of the city and State of New York, (late of New Orleans, Louisiana,) have invented a new and useful improvement in the method of evaporating and concentrating saccharine juices and sirup in the manufacture of sugar, and which is applicable to other fluids; and I do hereby declare the following to be a full and exact description of the same, reference being had to the annexed drawings, in which—

Plate 1 represents two sugar-pans arranged in the plan of the improvement hereinafter described. Figure 1, Plate 1, shows a front view of these pans so arranged. Fig. 2, Plate 1, shows a ground plan of the same; Fig. 3, Plate 1, a vertical section of the same; Fig. 4, Plate 1, a view of the same apparatus connected with the pumping-engine.

Plate 2 shows a modified arrangement of apparatus for employing the same improvement, as hereinafter described, Fig. 1, Plate 2, being a vertical section; Fig. 2, Plate 2, being a horizontal or top view thereof; Fig. 3, Plate 2, being a side view thereof, and Figs. 4 and 5 being a vertical section on the line 1 1 of Fig. 2.

Plate 3 is a view of a regulating-valve, by which the supply of exhaust-steam and steam from the boiler to the sugar-pans will regulate itself so as not to interfere with the running of the engine.

In the manufacture of sugar previous to my invention of the improvement hereinafter described, it had been customary to boil the sugar either in open pans or in the form of pans known as the Howard pans, and to permit the vapor evolved by the boiling sugar to escape either into the air or into the condenser. This vapor so evolved and escaping contained a large amount of latent heat, which heat was lost in the process of making sugar, as above mentioned. In most sugar-making districts fuel is very scarce and any mode of economizing heat is of great importance. My improvement has for its object the utilizing of this latent heat of the vapor arising from the boiling sugar by applying the vapor so evolved in one sugar-pan to heat another pan, in combination with the establishment of a vacuum or partial vacuum in such second pan, whereby the latent heat of the vapor escaping from the boiling sirup of one pan is made, in connection with the vacuum of the second pan, to boil the sirup contained in such second pan. And this improvement may be in like manner applied to three or more successive pans.

My improvement consists in the combination of the vacuum-pan or evaporator in which the sirups are evaporated *in vacuo* with a pan or evaporator or boiler in which the saccharine juices are prepared to be transferred to the vacuum-pan or evaporator, and which at the same time generates the vapor from the saccharine juices to supply the vacuum pan or pans with the required quantity of steam or vapor under sufficient pressure, and of a temperature sufficiently high to produce ebullition in the vacuum-pan or evaporator. By this improvement it will be seen that much heat which would otherwise escape and be lost is rendered available, and the quantity of fuel required is greatly diminished.

Having described the nature of my improvement, I shall proceed to describe the construction of the apparatus and the operation thereof by reference to the accompanying drawings, in which the letters of reference indicate the same parts in all the sections.

My improvement is represented by Plate 1, in which Figure 1 is an elevation of the pans or evaporators, with their connecting-pipes, &c. Fig. 2 is a plan, and Fig. 3 a longitudinal section, of the same; and Fig. 4, an elevation of the whole apparatus connected with the steam boilers, engine, and condenser.

The pan A or evaporator is constructed with a double bottom, or by tubular boilers or any other form of vacuum sugar-pan, leaving a space, *d*, into which steam of the required pressure is introduced from a steam-generator through the steam-pipe B′, there being a stop-cock or other valve, *v′*, to regulate or cut off the steam when required. The peculiar construction of this pan need not to be described, as it is only necessary to state that it should have two chambers, one for the saccharine juice and the other below it for the steam. The two pans or sets of pans may be similarly constructed. The saccharine juice is introduced into the pan or evaporator A by the pipe F, provided with a stop-cock, *f*, and there boiled by the heat of the steam introduced in the double bottom *d* or other form, as before described, and the steam arising from the evaporation of the saccharine juice in this the first pan is employed to boil the concentrated juice or sirup in the second pan, B, by passing off from the pan A through the pipe D to the double bottom *d*. The concentrated saccharine juice or sirup in the second pan, B, is boiled or evaporated *in vacuo*, after the manner of the well-known Howard process, by connecting the upper part of the pan with a condenser and air-pump, E being the connection-pipe, G the condenser, and H the air-pump, operated by the steam-engine or other power, and as these parts of the apparatus are well known to every engineer it is not necessary to describe them. The connection between the first and the second pans, A B, is by a pipe, G, which passes through the double bottom of the former, where it is provided with a valve, I, opening inward, and with the top of the latter, it being provided with a stop-cock, *g*, near its junction with the pan B, to regulate the supply of the concentrated saccharine juice to the second or vacuum pan. The operation of this part of the apparatus is very obvious. The pan B being exhausted by its connection with the condenser and air-pump, and the stop-cock *g* being opened, the saccharine juice which has been concentrated in the pan A by the steam in the false bottom *d* is forced up the pipe G into the pan B by the elastic force of the steam generated from the saccharine juice, and after the sirup has been sufficiently reduced in the second or vacuum pan, B, it is drawn off through a pipe, H′, which is provided with a weighted valve, I, opening inward, and having a lever and weight, *n*, the stem of the valve passing down through a pipe which connects the double bottom. These pans are provided with man-holes, a glass gage, or indicating-tube, K, to indicate the level of the juice, blow-cocks J J to expel the air from the double bottoms, thermometer and ebullition-gage O L, and pipes M N to discharge the water produced by the condensation of the steam in double bottoms or steam-chambers *d d′*.

My improvement above described is also applicable or adaptable to the apparatus known as the "Champenoise column."

My improvement, as applied to the Champenoise column, is shown in Plate 2 of the accompanying drawings, in which Figure 1 is a longitudinal elevation; Fig. 2, a plan; Fig. 3, a transverse elevation representing the condenser in section; Fig. 4, a longitudinal section of the vacuum-evaporator; and Fig. 5, the same of the pressure-evaporator.

As the two evaporators are similarly constructed, it will only be necessary to describe the construction of one of them and the manner of connecting the two.

The apparatus known as the "Champenoise column" consists of a vertical metallic column, A, the upper end of which is dome-shaped or semi-spherical. Within this column there is a steam-pipe, D′, extending from the base of the column to within a short distance of the top, through which steam is admitted to the inside of the column to heat it to the required temperature. The saccharine juice or sirup is discharged on the semi-spherical top or dome of this column, and in passing down is evaporated.

I have so modified this apparatus as to render my improvement above mentioned applicable—that is to say, the employment of an evaporator which works at or above the pressure of the atmosphere in combination with a second which evaporates *in vacuo*, the steam for heating the second being supplied from the first by the evaporation of the saccharine juice—and hence I have to employ two such columns. The column is represented at A′, Fig. 5, and the inner steam-pipe, which it envelopes, is represented at D, Fig. 4. My improvement consists simply in eveloping this column with an outer casing, as at A B. The two evaporators being thus constructed and enveloped by an outer casing, it remains simply to describe the manner of connecting them with each other, and with the boiler and condenser, and also the manner of supplying the saccharine juice to the first, and the concentrated juice to the second. The main steam-pipe C communicates with the vertical steam-pipe D within the first column, A, through a passage, R, in the base, and the saccharine juice is introduced and discharged onto the top or dome of this column A by the pipe F, which is connected with a bifurcated pipe, *u*, that turns in a collar or stuffing-box in the upper end of the outer casing, and is made to rotate to insure the regular discharge of the juice by miter-wheels on the shaft of the bifurcated pipe, and a horizontal shaft, *o*, that receives motion from the steam-engine or other first mover, the shaft and pipe being provided with stuffing-boxes to prevent the escape of steam. The saccharine juice, being thus equally distributed on the dome of the column, runs down to the bottom, and in passing over the surface heated by steam, as before described, is sufficiently evaporated or concentrated to be transferred to the other column, where it is further evaporated *in vacuo*. It is then forced out by the pressure of the steam-generated from the juice in concentrating it through a passage in the base of the column which communicates with the top of the vacuum-evaporator B by means of the connecting-pipe G, and it is there discharged on the top or dome of the column B′ in the same manner and by the same means as the saccharine juice is delivered on the first column, except that in the latter the miter-wheels, &c., to rotate the discharge-pipe are outside of the surrounding-case at *p*. The steam or vapor from the saccharine juice in the evaporator A passes off through the pipe D, enters the base of column B′ at R′ up the pipe D′, and is discharged at the required temperature near the upper part of the column. The upper part of the evaporator B communicates by the pipe E with the condenser Q of any construction; but the one represented in the drawings is made after the manner of the well-known Hall condenser, and therefore needs not to be described. It is of course understood that the condenser is provided with an exhausting or air pump.

The evaporators A and B may be provided with a glass gage, S, to indicate the level of the saccharine juice and sirup, and with a thermometer and steam-gage. The water or condensed vapor is discharged from the base of the column *a'* through separate apertures, each of which communicates with its appropriate pipe *m* and *n*. The sirup passes out from the evaporator B through an aperture into the vessel H, that contains a differential thermometer, to regulate the bake or concentration of the sirup, and from this vessel it is discharged into the double-bottom pan K, already described, by a rotating cock, X, known as the "rotating feeding-cock." This cock has a chamber or chambers in it, which as it rotates is alternately presented to the pipe leading from the vessel H and the pipe discharging into the pan K, and in this manner for each chamber in the cock at each rotation a measure of sirup is discharged. Motion is given to this cock by the vertical arbor Y, which is geared with the horizontal shaft *p*, that communicates motion to the discharge-pipe *u* in the evaportor B. A pipe, L, extends from the main steam-pipe C to each of the exaporators A and B for the purpose of admitting steam to cleanse the surface of the columns A' and B'.

When the steam for heating the first pan is obtained in part from the exhaust of the engine and in part from the boiler, it is important to have some means of regulating the amount of steam so withdrawn directly from the boiler and that supplied by the exhaust of the engine, so that sufficient steam may be supplied to the first pan without interfering with the action of the engine. A mechanism and apparatus for effecting this end is shown in Fig. 4, Plate 1, which is an elevation of the steam boiler or boilers, steam-engine, the evaporating-pans, and the connection of the three; and Fig. 1, Plate 3, is a view of the engine, together with the steam-pipes, which form the connection between the boiler, the engine, and the evaporating-pans. The main steam-pipe B' from the boilers A' extends to the pan or evaporator A, and introduces the steam in the false bottom *d*, and at *a* there is a branch pipe conducting to the cylinder C of the steam-engine, and another at *c*, which connects with the eduction-valve of the engine, and between these two branch pipes, which are the induction and eduction pipes, the main steam-pipe B' is provided with a loaded throttle or other valve, as at *b*, Fig. 1, Plate 3, and *v*, Fig. 4, Plate 1. By this arrangement it will be evident that the engine can only be worked by the pressure of the steam over and above that required for the pan or evaporator A, and as the steam cannot pass the weighted or throttle or other regulating valve, except it be of a higher pressure than is required to move the steam-engine, it passes through the pipe *a* to the engine and from thence through the eduction-pipe *c* to the false bottom *d* of the pan, and all the additional steam that is required beyond that which passes through the engine goes directly through the eduction-pipe *e* and regulating-valve to the evaporating-pan. The difference between the pressure in the boilers A' and the false bottom *d* will be the effective pressure exerted on the piston of the engine. Thus all the steam generated in the boilers A, except the small quantity condensed, will be conducted and give out its heat to the pan or evaporator A. It is of course to be remembered that the pressure of the steam in the false bottom *d*, or rather its temperature, is to be regulated in the usual way. Should it be desired at any time to conduct the steam directly to the pan or evaporator A without working the engine, the valve *b'* is closed, and the steam passes along the main pipe B, its pressure or temperature being regulated in any of the well-known methods. This arrangement is applicable to other kinds of boilers and evaporators. The throttle-valve in this arrangement can be connected with the governor of the steam-engine in manner well-known to machinists and engineers.

Having thus described my improvement, I do not desire to claim generally the application of the vapor arising from one heated fluid to the heating of fluids contained in other vessels, if in such cases the fluid in the second vessel is not under a vacuum or partial vacuum; but

What I do claim, and desire to secure by Letters Patent as my invention, is—

1. The employment of a vacuum pan or pans, in combination with an evaporating pan or pans or boiler in which the saccharine juice or other fluid is evaporated under a pressure lower, equal to, or greater than the atmosphere, which last-mentioned pan or pans or boiler prepares the saccharine juice, &c., from the vacuum pan or pans, and at the same time supplies the necessary vapor from the saccharine juice, &c., to complete the evaporation or concentration of the sirup, &c., in the vacuum pan or pans, as fully described above.

2. The employment of a weighted throttle or other regulating-valve in the main steam-pipe, arranged and operating in the manner and for the purpose as hereinbefore described.

N. RILLIEUX.

Witnesses:
WILLIAMS OGLE,
GEORGE HARDING.